United States Patent [19]
Abbott et al.

[11] 4,428,105
[45] Jan. 31, 1984

[54] BEARING STAKING TOOL AND METHOD

[75] Inventors: Johnnie G. Abbott, Burleson; Ralph V. Brown, Fort Worth, both of Tex.

[73] Assignee: General Dynamics Corporation, Fort Worth, Tex.

[21] Appl. No.: 336,932

[22] Filed: Jan. 4, 1982

[51] Int. Cl.³ .............................................. B21D 53/10
[52] U.S. Cl. ............................ 29/149.5 B; 29/441 R; 29/515; 29/522 A; 29/243.52; 29/283.5; 29/402.19; 72/124
[58] Field of Search ................... 29/441 R, 725, 283.5, 29/149.5 B, 522 R, 243.52, 515, 402.19; 264/242; 72/126, 124

[56] References Cited

U.S. PATENT DOCUMENTS

| | | | |
|---|---|---|---|
| 2,898,671 | 8/1959 | Heim | 29/149.5 B |
| 3,042,245 | 7/1962 | Schwartz | 29/243.52 |
| 3,369,285 | 2/1968 | Heim | 29/283.5 |
| 3,444,606 | 5/1969 | Jones | 29/243.52 |
| 3,639,961 | 2/1972 | Schiflet | 29/725 X |
| 3,662,462 | 5/1972 | Shiflet | 29/149.5 B |
| 4,318,212 | 3/1982 | Schnabel | 29/283.5 X |

Primary Examiner—Charlie T. Moon
Attorney, Agent, or Firm—Arthur F. Zobal

[57] ABSTRACT

A C-shaped member having a threaded aperture formed through one end and a smooth surface aperture formed through the other end. A threaded rod extends through the threaded aperture with the threads of the rod mating relationship with the threads in the threaded aperture. The rod has a swivel member at its end located between the two ends of the C-shaped member. A roller staker comprising staking rollers at one end and a spindle at an opposite end is provided. The spindle is adapted to be located in the smooth surface aperture with the staking rollers located between the two ends of the C-shaped member and facing the swivel member. The spindle when located in the smooth surface aperture has an end portion extending through the aperture whereby it may be gripped by a portable drill and rotated for rotating the staking rollers.

4 Claims, 5 Drawing Figures

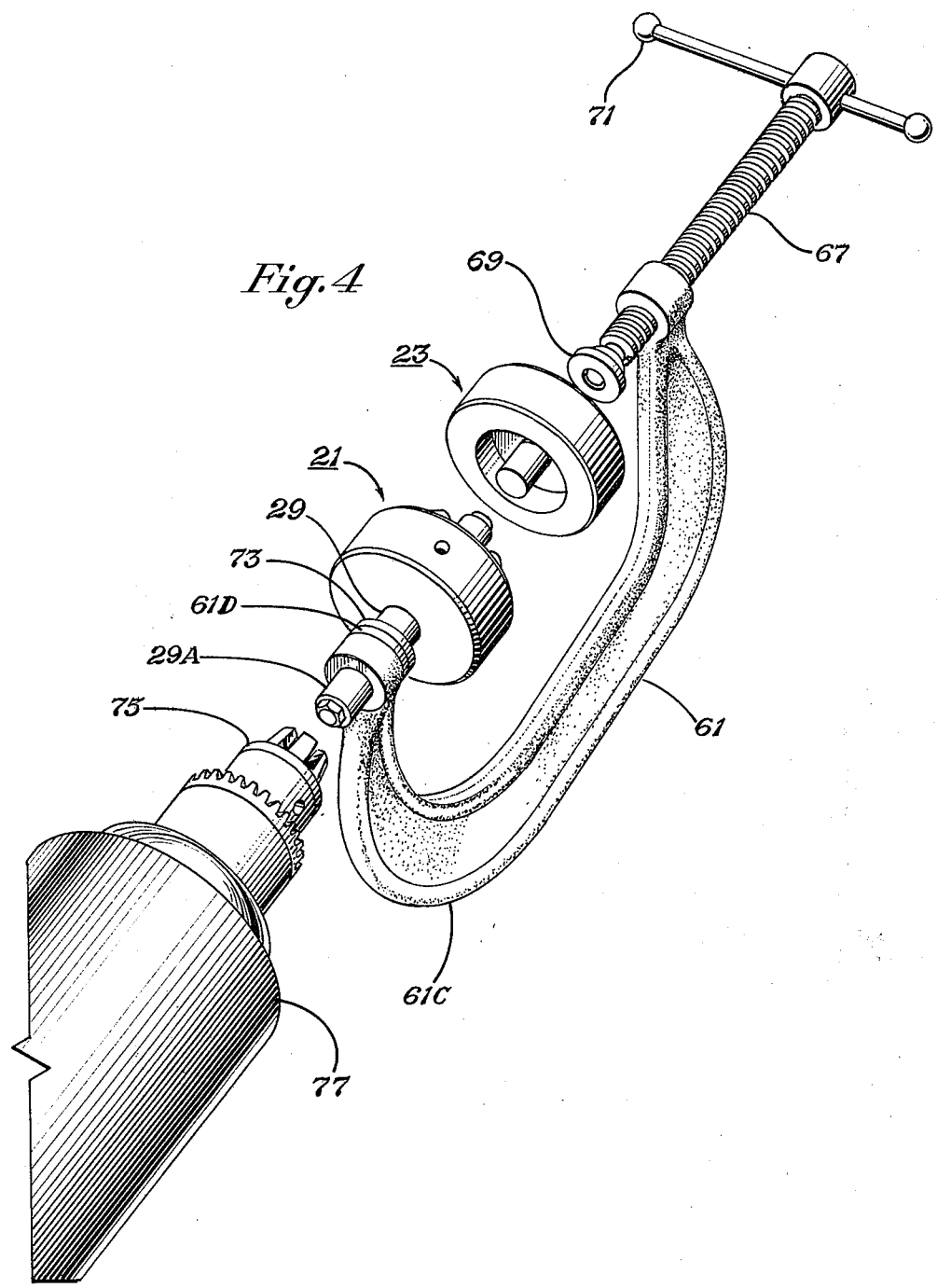

BEARING STAKING TOOL AND METHOD

The Government has rights in this invention pursuant to Contract No. F33657-78-C-0669 awarded by the Department of the Air Force.

BACKGROUND OF THE INVENTION

1. Field of the Invention

The present invention relates to a portable bearing staking tool for staking a bearing to a housing.

2. Description of the Prior Art

In the past, bearings in certain components on aircraft have been staked to a housing using either a hydraulic press or a drill press employing stacking rollers. The use of such equipment has disadvantages since it increases the overhead cost and it limits the location of the staking operation. The use of such equipment is particularly disadvantageous where repair or restaking operations are required for bearings in housing components assembled to aircraft, since the housing component must be disassembled from the aircraft, restaked, and reassembled to the aircraft, a very time consuming procedure. The use of a drill press for staking purposes also has disadvantage since it limits the ability to stake bearings to large housings due to the relatively small throat depth of drill presses and requires a heavy duty drill press in order to obtain proper alignment.

SUMMARY OF THE INVENTION

It is an object of the present invention to provide an effective, portable, light weight and inexpensive tool and a method of using the tool for stacking a bearing to a housing.

It is a further object of the present invention to provide a staking tool and method which allows a bearing to be staked to a housing while assembled to a structural component such as that which forms part of an aircraft.

The staking tool comprises a C-shaped member comprising a main body portion having first and second aligned end members spaced from each other and extending generally transverse from said main body portion. First and second aligned apertures are formed through said first and second end members respectfully. Said first aperture is threaded and said second aperture has a smooth inner surface. A threaded rod extends through said first aperture and has threads which mate with the threads formed in said first aperture. A swivel means is secured to the end of said threaded rod between said first and second end members. A roller staker comprising staking rollers at one end and a spindle at an opposite end is provided. The spindle is adapted to be located in said second aperture with said staking rollers located between said first and second end members and facing said swivel means. The spindle when located in said second aperture has an end portion extending through said second aperture whereby it may be gripped by a drill means and rotated for rotating said staking rollers. Means is provided for allowing said threaded rod to be rotated in one direction to locate said swivel means from said staking rollers sufficient to receive a bearing and its housing and to be rotated in an opposite direction for applying force by said swivel means and said staking rollers to opposite ends of the bearing and housing whereby the bearing may be staked to the housing by gripping said end portion of said spindle with a drill means and rotating said spindle and said staking rollers while axial force is applied by said swivel means and said staking rollers to opposite ends of the bearing and housing independent of the drill means.

BRIEF DESCRIPTION OF THE DRAWINGS

FIG. 4 illustrates one embodiment of the present invention comprising the C-clamp of FIG. 3 employing the roller staker and bearing backup tool of FIG. 2 and a portable drill for staking a bearing to a housing.

DESCRIPTION OF THE PREFERRED EMBODIMENTS

Figure 1:
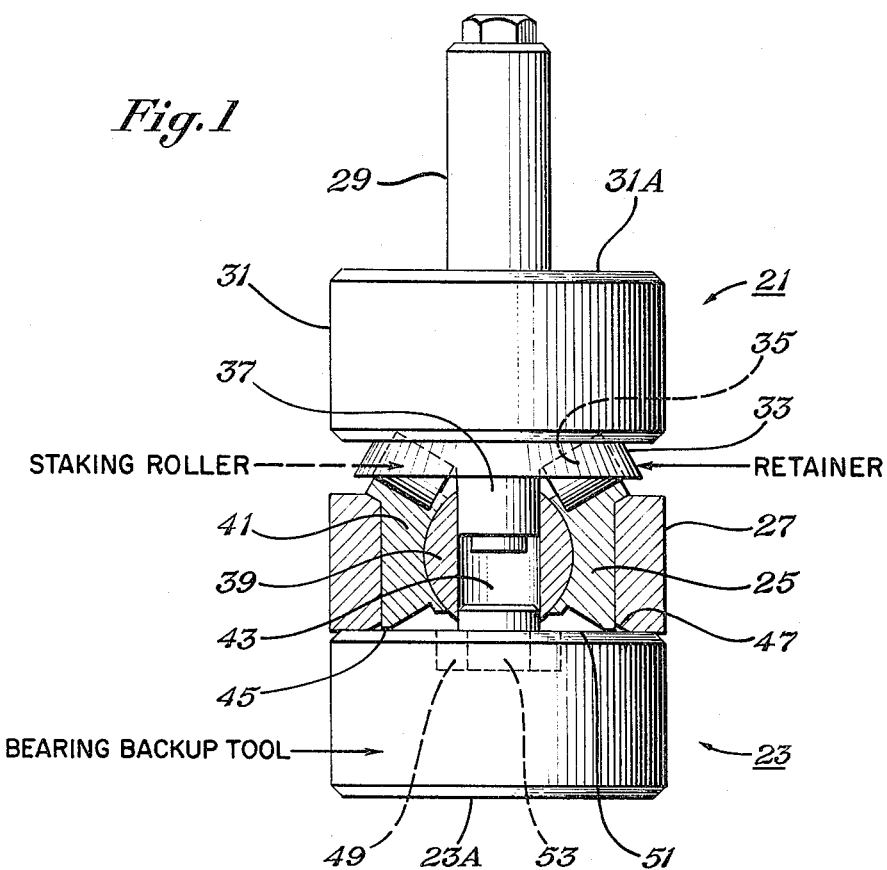
FIG. 1 illustrates a conventional roller staker and bearing backup tool which has been used in a drill press for staking a bearing to a housing.

Referring now to FIG. 1, there is illustrated a roller staker 21 and a bearing backup tool 23 which have been employed in a drill press for staking a bearing 25 to a housing 27, which are shown in cross-section. The roller staker 21 comprises a spindle 29 attached to a body 31 which carries a retainer 33 which support rollers 35. The rollers 35 surround a central cylindrical member 37 which extends beyond the rollers 35. The bearing 25 comprises an inner member or ball 39 carried by an annular outer race 41. The member 39 has a central cylindrical shaped aperture 43 formed therethrough and is rotatable within the outer race 41. The housing 27 has a cylindrical shaped inside surface for receiving the annular race 41 and hence the member 39. The outer race 41 of the bearing has an annular lip 45 at each end which is bent or swaged over the housing chamfer 47 for staking the bearing 25 to the housing 27. The bearing backup tool 23 comprises a body having an annular groove 49 formed in one end 51 and which surrounds a cylindrical member 53 that extends beyond the end 51.

Figure 2:
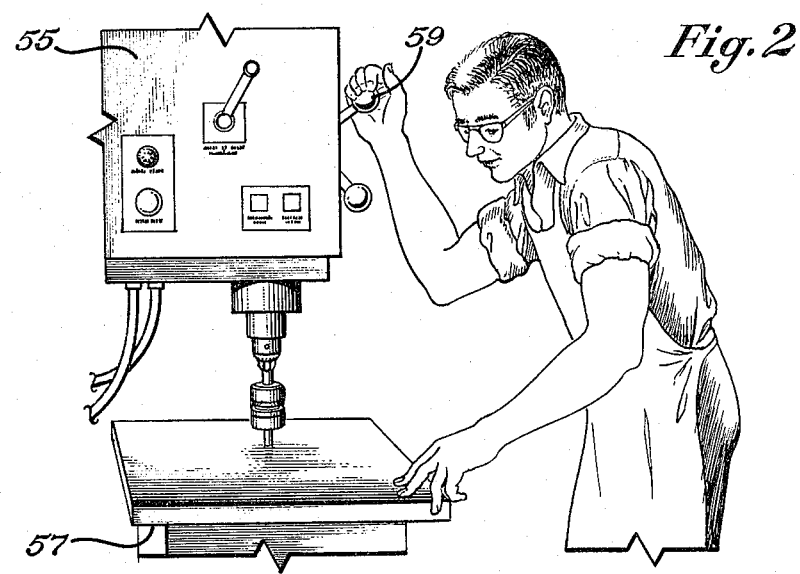
FIG. 2 illustrates the roller staker of FIG. 1 gripped by the chuck of a drill press and located next to the bearing backup tool of FIG. 1 which is supported by the table of the drill press.

In carrying out staking operations in a drill press 55 shown in FIG. 2, the bearing backup 23 is supported by the table 57 with the bearing 25 located in the housing 27 and supported by the bearing backup tool 23 with cylindrical member 53 extending partially within aperture 43 of the member 39. The spindle 29 of the roller staker 27 is gripped with the chuck of the drill press and lowered by operating the handle 59 of the drill press to locate cylindrical member 37 partially within the aperture 43 of member 39 and to bring the rollers 35 into engagement with the lip 45. The drill press then is operated to rotate the staker roller 21 at 200–300 RPM while the handle 59 is operated to apply a force of about 150 pounds to the bearing 25 and housing 27, between the rollers 35 and the bearing backup tool 23, to swage the lip 45 over the chamfer 47. The bearing backup tool 23 prevents the bearing 25 from being pushed out of the housing 27 when the 150 pounds force is applied. When one side of the bearing 25 has been staked to the housing 27, rotation of the roller staker 21 is terminated and the handle 59 operated to raise the staker roller 21 to allow the bearing and housing to be turned over and the staking procedure is repeated on the other side. As pointed out above, the use of a drill press for staking a bearing to a housing has certain disadvantages.

Figure 3:
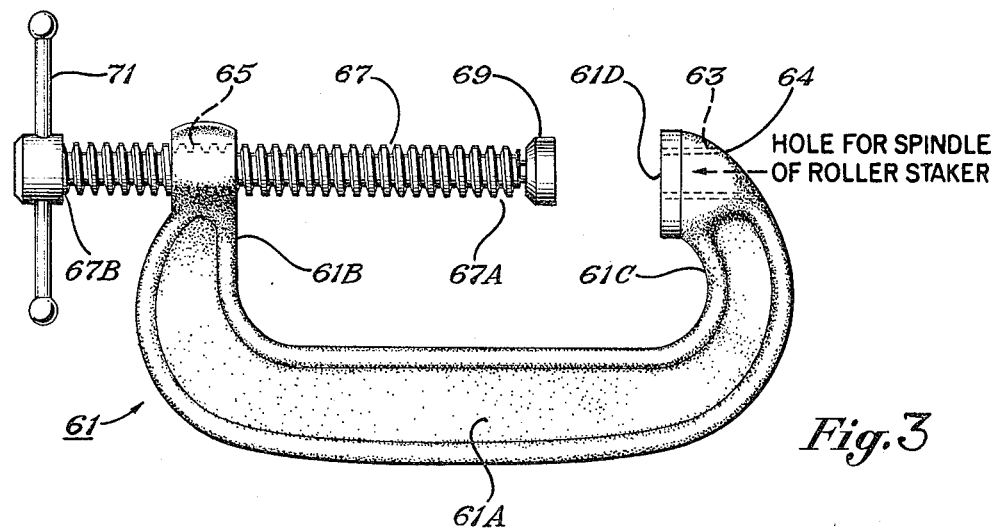
FIG. 3 illustrates a conventional C-clamp modified for receiving the spindle of the roller staker of FIG. 2.

Referring now to FIGS. 1, 3 and 4, there will be described the bearing staking tool of the present invention which alleviates the requirement of a drill press or a hydraulic press and which has advantages particularly for use in remote areas and for repair or restaking operations of bearings in housing components assembled to aircraft. The tool comprises a conventional C-clamp 61 modified by having a cylindrical shaped aperture 63 formed through one of its end members for receiving the spindle 29 of the roller staker 21. Member 64 is a hollow cylindrical bearing located in aperture 63. It has a smooth inner cylindrical shaped surface within which the spindle 29 rotates. The C-clamp 61 comprises a body portion 61A having spaced apart and aligned end members 61B and 61C extending generally transversely from the body portion 61A. Portions 61A, 61B, and 61C are formed of steel. A threaded aperture 65 is formed through end member 61B for receiving a threaded steel rod 67. A swivel member 69 is secured to the end 67A of the rod 67 between the two end members 61B and 61C. The member 69 swivels or pivots on a ball (not shown but connected to the end 67A of the rod 67) in the conventional manner. A handle or grip 71 is secured to the opposite rod 67B of the rod 67 for allowing the rod 67 to be screwed in threaded aperture 65 in opposite directions. The aperture 63 is in alignment with aperture 65. The face 61D has been heat treated.

In carrying out a bearing staking operation, the rod 67 is screwed in a direction to widen the distance between the swivel member 69 and end face 61D. The spindle 29 of the roller staker 21 is located in bearing member 64 of aperture 63 to a position where its end portion 29A extends beyond end member 61C. An annular thrust bearing 73 is located around the spindle 29 between the end face 61D and the back side 31A of the body 31 of the roller staker 21. During staking operations, the back side 31A of the roller staker 21 engages the thrust bearing 73 which engages the end face 61D. The end portion 29A of the spindle 29 is gripped by the chuck 75 of a portable drill 77 capable of rotating the roller staker at 200–300 RPM. The motor of the drill 77 may be either electric or air operated. The back side 23A of the bearing backup tool 23 is seated against swivel member 69 and the bearing 25 and housing 27 (with the bearing 25 inserted in the housing 27) are located between the roller staker 21 and the bearing backup tool 23. If the housing 27 is attached to structure of an aircraft, such as structure at the edge of a wing, the bearing 25 is inserted in the housing 27 and the tool of the present invention is moved to locate the roller staker 21 and bearing backup member 23 on opposite sides of the bearing 25 and housing. The handle 71 then is turned in a direction to seat the rollers 35 against the lip 45 with member 37 located within aperture 43 of the bearing and to seat the end 51 of bearing backup tool 23 against the housing 27 with member 53 located within aperture 43 of the bearing as shown in FIG. 1. The motor of the drill 77 then is activated to rotate the roller staker 21 and the handle 71 and hence the rod 67 are slowly turned to move the swivel member 69 and backup member 23 toward the roller staker 21 until the lip 45 of the bearing 25 is properly staked to the housing 27. As the rod 67 is turned to move the swivel member 69 and the backup member 23 toward the roller staker 21 for staking purposes, an axial force is applied by the swivel member 69 (and backup member 23) and roller staker 21 to the opposite ends of the bearing 25 and housing 27 independent of the drill 77. After one side of the bearing is staked to the housing rotation of drill 77 is terminated; the handle 71 turned in the opposite direction to release the pressure; and the bearing and the housing or the tool (if the housing is attached to a structural member) turned over to stake the other side of the bearing to the housing. When staking a bearing to a housing not attached to any structure, it has been found that the pressure applied by the threaded rod 67 will prevent the bearing 25 and housing 27 and bearing backup tool 23 from rotating while the roller staker 21 is rotated for staking purposes. The purpose of having the swivel member 69 is to maintain the bearing and housing centered relative to the roller staker and have the pressure centered in the event that the end members 61B and 61C yield slightly to the pressure applied by rod 67 during the staking operation. If the pressure is exerted off center, improper staking will occur.

Different size C-clamps with different throat lengths may be used for the tool of the present invention to cover a wide range of part sizes.

Figure 5:
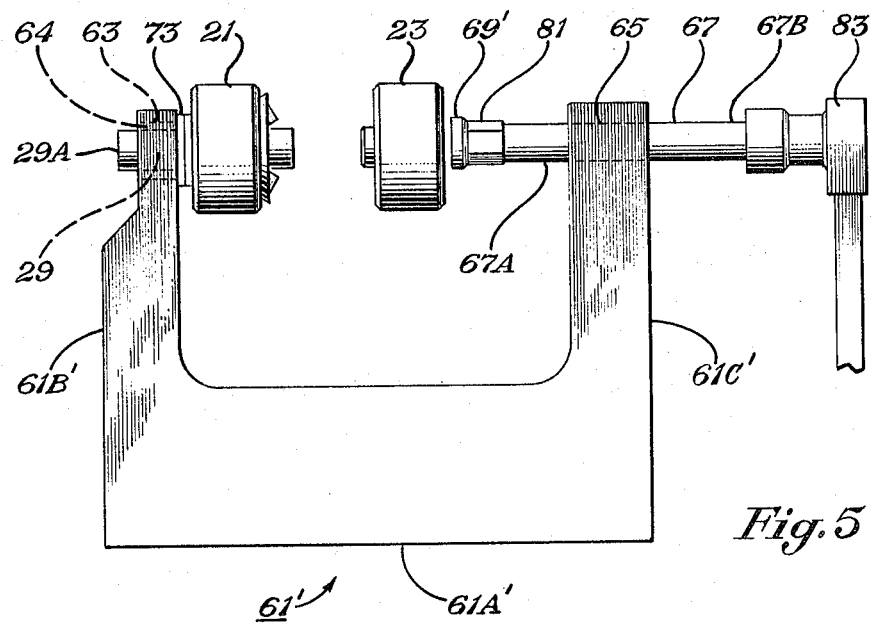
FIG. 5 illustrates a preferred embodiment of the staking tool of the present invention.

Referring now to FIG. 5, the tool is modified in that the end members 61B' and 61C' of the C-shaped body 61' are straight and form 90° corners relative to the body portion 61A'. The C-shaped body is formed of steel and is heat treated in its entirety. The threaded rod 67 (threads not shown) has a swivel nut 81 screwed to its end 67A and a ratchet 83 fixedly secured to its end 67B. A swivel member 69' is secured to the nut 81.

We claim:
1. A bearing staking tool for staking a bearing to a housing, comprising:
   a C-shaped member comprising a main body portion having first and second aligned end members spaced from each other and extending generally transverse from said main body portion,
   first and second aligned apertures formed through said first and second end members respectfully,
   said first aperture being threaded and said second aperture having a smooth inner surface,
   a threaded rod extending through said first aperture and having threads which mate with the threads formed in said first aperture,
   a swivel means secured to the end of said threaded rod between said first and second end members,
   a roller staker comprising staking rollers at one end and a spindle at an opposite end,
   said spindle being adapted to be located in said second aperture with said staking rollers located between said first and second end members and facing said swivel means,
   said spindle when located in said second aperture having an end portion extending through said second aperture whereby it may be gripped by a drill means and rotated for rotating said staking rollers, and
   means for allowing said threaded rod to be rotated in one direction to locate said swivel means from said staking rollers sufficient to receive a bearing and its housing there between and to be rotated in an opposite direction for applying force by said swivel means and said staking rollers to opposite ends of the bearing and housing whereby the bearing may be staked to the housing by gripping said end portion of said spindle with a drill means and rotating said spindle and said staking rollers while axial force is applied by said swivel means and said staking rollers to opposite ends of the bearing and housing independent of the drill means.

2. The bearing staking tool of claim 1 comprising:
a backup member adapted to be located between said swivel means and the bearing and the housing when the bearing is being staked to the housing.

3. The bearing staking tool of claim 1 or 2, comprising:
a thrust bearing adapted to be located around said spindle between the back side of said roller staker and said second end member.

4. A method of swaging an annular lip of a bearing to a surrounding housing by employing a C-shaped member comprising a main body portion having first and second aligned end members spaced from each other and extending generally transverse from said main body portion, first and second aligned apertures formed through said first and second members respectfully, said first aperture being threaded and said second aperture having a smooth inner surface, a threaded rod extending through said first aperture and having threads which mate with the threads formed in said first aperture, swivel means secured to the end of said threaded rod between said first and second end means, a roller staker comprising staing rollers at one end and a spindle at an opposite end, said spindle being adapted to be located in said second aperture with said staking rollers located between said first and second end members and facing said swivel means, said spindle when located in said second aperture having an end portion extending through said second aperture whereby it may be gripped by a drill means and rotated for rotating said staking rollers, said method comprising the steps of:

seating a backup member against said swivel means,
locating a bearing and a surrounding housing between said roller staker and said backup member,
rotating said threaded rod in a direction to cause said staking rollers to engage the lip of the bearing and said backup member to engage the other end of the housing,
operating the drill means to rotate said roller staker, and
continuing to rotate said threaded rod in said direction to apply axial force to opposite ends of the bearing and the housing by said roller staker and said swivel member independent of the drill means to cause said staking rollers to swage the lip of the bearing to the surrounding housing.

* * * * *